United States Patent
Lewendon

(10) Patent No.: US 11,988,232 B2
(45) Date of Patent: May 21, 2024

(54) ACTUATOR ROTATIONAL ALIGNMENT DEVICE

(71) Applicant: L3Harris Release & Integrated Solutions Ltd, Brighton (GB)

(72) Inventor: James Lewendon, Brighton (GB)

(73) Assignee: L3Harris Release & Integrated Solutions, Ltd., Brighton (GB)

(*) Notice: Subject to any disclaimer, the term of this patent is extended or adjusted under 35 U.S.C. 154(b) by 528 days.

(21) Appl. No.: 16/648,704

(22) PCT Filed: Sep. 17, 2018

(86) PCT No.: PCT/GB2018/052643
§ 371 (c)(1),
(2) Date: Mar. 19, 2020

(87) PCT Pub. No.: WO2019/058102
PCT Pub. Date: Mar. 28, 2019

(65) Prior Publication Data
US 2020/0271139 A1 Aug. 27, 2020

(30) Foreign Application Priority Data
Sep. 19, 2017 (GB) .................................. 1715127

(51) Int. Cl.
*F15B 15/06* (2006.01)
*F15B 15/16* (2006.01)
(Continued)

(52) U.S. Cl.
CPC ............ *F15B 15/063* (2013.01); *F15B 15/16* (2013.01); *B64D 1/08* (2013.01); *F15B 15/1471* (2013.01)

(58) Field of Classification Search
CPC .... F15B 15/16; F15B 15/063; F15B 15/1471; B64D 1/02; B64D 1/08
See application file for complete search history.

(56) References Cited

U.S. PATENT DOCUMENTS 3,576,151 A * 4/1971 Sendoykas ............ F15B 15/261
92/24
3,799,036 A 3/1974 Slaughter
(Continued)

FOREIGN PATENT DOCUMENTS

| CN | 102562912 | * | 7/2012 | ............ F16F 9/0218 |
| DE | 1857686 | * | 11/2007 | ............ F15B 15/261 |

(Continued)

OTHER PUBLICATIONS

International Patent Application No. PCT/G82018/052643, International Search Report, dated Jan. 4, 2019.
(Continued)

*Primary Examiner* — Dustin T Nguyen
(74) *Attorney, Agent, or Firm* — Kilpatrick Townsend & Stockton LLP

(57) ABSTRACT

An e.g. fluid powered linear actuator is provided with a helical orientation surface in a fixed angular position relative to a first component; and a follower in a fixed angular position relative to a second component. When the first and second components are moved towards one another as the actuator is retracted, the follower engages and moves along the helical orientation surface to rotate the first and second components to a predetermined relative angular position.

14 Claims, 5 Drawing Sheets

(51) Int. Cl.
 *B64D 1/08* (2006.01)
 *F15B 15/14* (2006.01)

(56) References Cited

U.S. PATENT DOCUMENTS

| | | | |
|---|---|---|---|
| 3,948,502 A | | 4/1976 | Waller et al. |
| 4,351,516 A | * | 9/1982 | Ersoy .................. B25B 5/062 92/33 |
| 6,234,062 B1 | * | 5/2001 | Griffin .................. F15B 15/19 92/53 |
| 6,575,678 B2 | * | 6/2003 | Cottrell ................ F15B 15/264 92/17 |
| 7,900,756 B2 | * | 3/2011 | Mintgen .................. F16F 9/54 188/300 |
| 2002/0046834 A1 | * | 4/2002 | Rayssiguier ............ E21B 33/12 166/242.6 |
| 2012/0312154 A1 | | 12/2012 | Langford |

FOREIGN PATENT DOCUMENTS

| | | |
|---|---|---|
| DE | 102011015959 A1 | 10/2012 |
| EP | 2508773 A1 | 10/2012 |
| EP | 2532821 A2 | 12/2021 |
| JP | 2012220028 | 11/2012 |
| WO | 2005095047 A1 | 10/2005 |

OTHER PUBLICATIONS

International Patent Application No. PCT/G82018/052643, Written Opinion, dated Jan. 4, 2019.
China Patent Application No. 201880058385.3, Office Action, dated Nov. 3, 2021.
Korean Patent Application No. 10-2020-7006736, Office Action, dated Mar. 28, 2023, 6 pages including translation.

\* cited by examiner

ACTUATOR ROTATIONAL ALIGNMENT DEVICE

CROSS-REFERENCE TO RELATED APPLICATIONS

This application is a national phase entry under 35 USC § 371 of International Application PCT/GB2018/052643 ("the '643 application"), filed Sep. 17, 2018, which application claims priority to and benefits of United Kingdom Patent Application No. 1715127.5 ("the '275 application"), filed on Sep. 19, 2017. The '643 application and the '275 application are hereby incorporated in their entireties by this reference.

This invention concerns rotational alignment devices for linear actuators of the type that include parts which, when the actuator is extended, are or would be free to twist relative to one another about the extension axis, unless additional measures are taken to prevent such twisting.

Fluid operated linear actuators typically include a piston slideable in a cylinder, with a fluid-tight seal required between these components. To make sealing easier, the piston and cylinder usually have matched circular cross-sections. This leaves the piston free to twist in the cylinder, unless constrained by the components or mechanism between which the piston and cylinder operate. Such constraint is not always available unless specifically provided, and such twisting is not always desirable. For example, when the actuator is a high speed, high pressure gas operated actuator used for emergency release, or used to eject a payload from an aircraft, once the load has been released or ejected, the end of the piston used to push against the load is freely projecting and can adopt an essentially random orientation by rotating about the piston axis. The piston will typically be equipped with a shaped ejector shoe or yoke which is used to push against the load. Once the load has gone, the shoe will rotate randomly and unpredictably in the aircraft slipstream, causing unpredictable changes in drag, radar cross section, vibration and airframe stresses, and upon retraction representing a rotational misalignment. As another example, the actuator may retractably suspend a castor wheel of an aircraft undercarriage. Difficulties may arise when attempting to retract the undercarriage into the body of the aircraft, if the castor wheel remains free to rotate about the actuator piston axis. Similar problems can arise in other kinds of linear actuators, such as electrically powered linear motors with armatures free to rotate about their operating axis.

It is known to prevent the twisting of a fluid-operated actuator piston in its cylinder using a specially provided constraint arm, pivotally joined at one end to the cylinder or to another suitable fixed point, and pivotally joined at the other end to the free end of the piston. The arm has a central hinge or elbow, allowing it to extend and retract along with the actuator. However, the arm adds to the overall weight of the actuator assembly, even if made from lightweight, high strength materials, such as titanium alloys. These materials tend to be expensive. When the piston is retracted, the elbow of the arm projects laterally a considerable distance, which can be difficult to accommodate within the limited space available on an aircraft, and can increase drag significantly.

These problems are addressed according to the present invention, which provides a linear actuator comprising a first component extendable and retractable relative to a second component along an operating axis; the first and second components being freely rotatable relative to each other about the operating axis; in which a helical orientation surface is disposed about the operating axis and in a fixed angular position relative to the first component; in which a follower is disposed in a fixed angular position about the operating axis relative to the second component; and in which when the first and second components are moved relative to one another towards an end of the operating axis, the follower moves from a disengaged condition in which the free relative rotation of the first and second components is allowed, to a condition in which the follower engages and moves along the helical orientation surface to rotate the first and second components relative to one another about the operating axis, until the follower reaches a predetermined position along the helical orientation surface. The first and second components are thereby brought into a predetermined angular orientation relative to one another about the operating axis.

The end of the operating axis towards which the first and second components are moved may be the end at which the first and second components are extended relative to one another, or it may be the end at which the first and second components are retracted relative to one another. Indeed, where required, the first and second components may be provided with a further helical orientation surface and a further follower respectively, positioned and arranged to operate similarly to the helical orientation surface and follower previously described, so that the first and second components are brought into a predetermined angular orientation relative to one another about the operating axis, in both the extended and in the retracted positions relative to one another.

The follower may comprise a helical surface complementary to the helical orientation surface. This may assist in reducing impact forces and wear on both the helical orientation surface and on the follower. The follower and/or the helical orientation surface may be resiliently mounted for limited movement along the operating axis, to assist in cushioning impact forces and in reducing wear.

The helical orientation surface may comprise a single peak and a single trough, whereby the first and second components are turned from a random angular orientation relative to one another about the operating axis, to a single predetermined angular orientation relative to one another about the operating axis. Such an arrangement is appropriate where the actuator is connected to an operating member, such as an ejector shoe or a castor wheel (to use the examples mentioned above) which has no rotational symmetry (rotational symmetry of order 1). Alternatively, the helical orientation surface may comprise a plurality of peaks and troughs. More generally, for example, n peaks and n troughs will be appropriate for an operating member having rotational symmetry of order n, where n is a positive integer. For example, an ejector shoe or yoke will often have rotational symmetry about the actuator axis of order 2. So n=2 may be used for the shape of the corresponding helical orientation surface.

The helical orientation surface may be generally annular in plan, when viewed along the operating axis. The helical orientation surface may slope helically to either side of a given peak towards the next trough or troughs. This means that the first and second components will rotate either clockwise or anticlockwise relative to each other, through the shortest angular distance to the next trough (i.e. to a predetermined relative angular orientation of the first and second components about the operating axis). Alternatively, the or each peak may only slope from one side towards the next trough. This means that the first and second components will only rotate in one direction relative to one another about the operating axis, but potentially may have to move through a larger angle to reach a predetermined angular orientation about the operating axis.

The first component may be the operating member (such as the ejector shoe or castor wheel in the previously mentioned examples), and the second component may be an external housing, casing or frame of the actuator; or a chassis or frame or ground component to which the actuator is fixed; or vice versa, as regards the identities of the first and second components. Additionally or alternatively, the first and second components may be parts internal to a fluid powered actuator; for example (a) a gas entry sleeve and (b) an intermediate telescopic component of a multi-stage gas powered actuator, for example as described in GB2530762; either one of which may be the first component and the other then being the second component. The helical orientation surface and the follower are thereby physically enclosed and protected against accidental jamming.

The invention and some of its further advantages and optional features may be further understood from the following description of illustrative embodiments, made by way of non-limiting example and with reference to the drawings, in which:

FIG. 1 shows a prior art gas-powered actuator and ejector shoe equipped with a constraint arm for preventing the shoe from rotating about the actuator operating axis;

FIG. 2 corresponds to FIG. 1, but shows the actuator in a retracted position;

Figure 3:
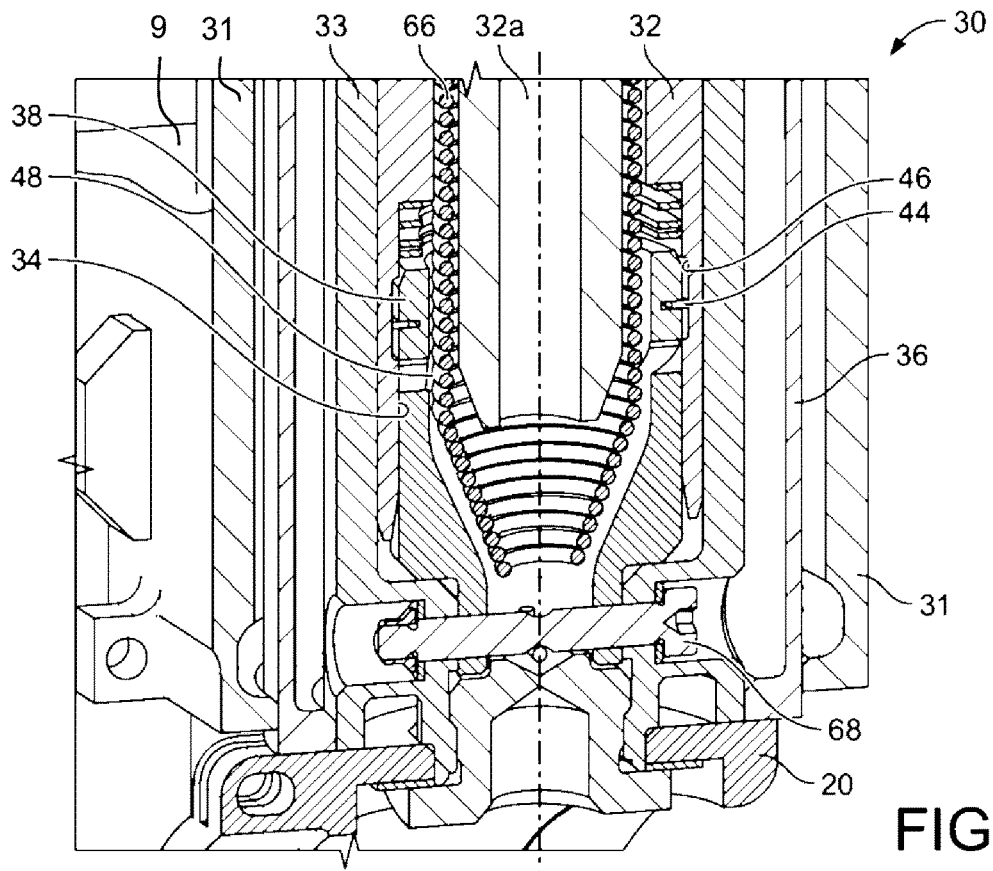
FIGS. 3 and 4 are longitudinal cross-sectional and longitudinal part cross-sectional views respectively, showing the lower end of a multi-stage gas powered actuator comprising a helical orientation surface and a co-operating follower, in accordance with an embodiment of the invention.
Figure 4:
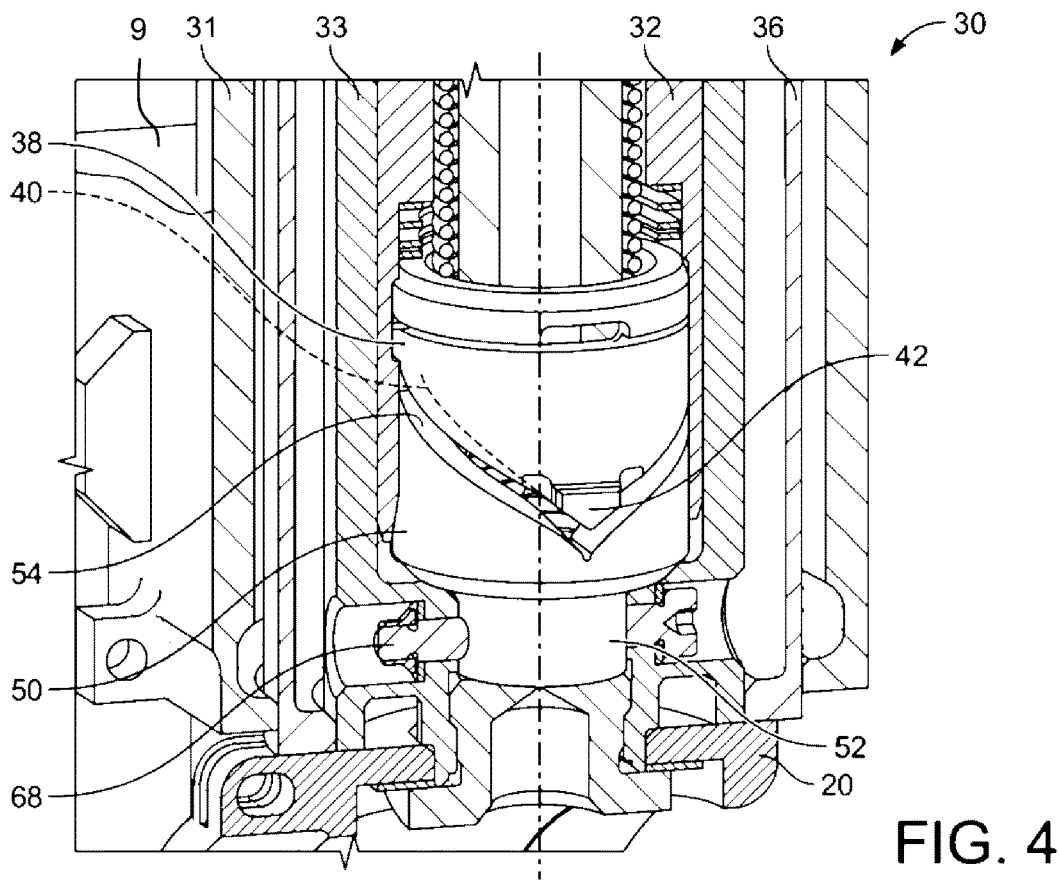
Figure 5:
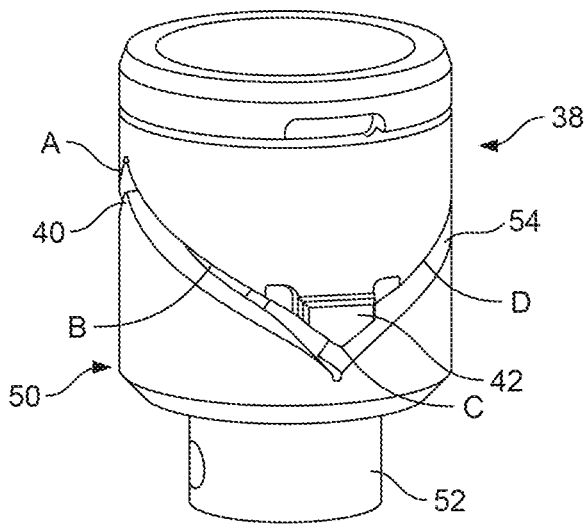
FIG. 5 is a detailed perspective view showing the helical orientation surface-carrying component and the follower component, separated from the remainder of the actuator of FIGS. 3 and 4.
Figure 6:
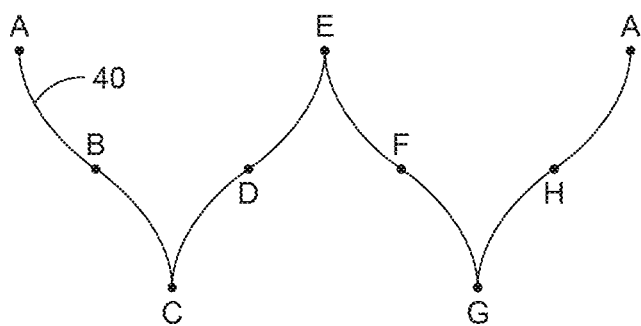
Figure 10:
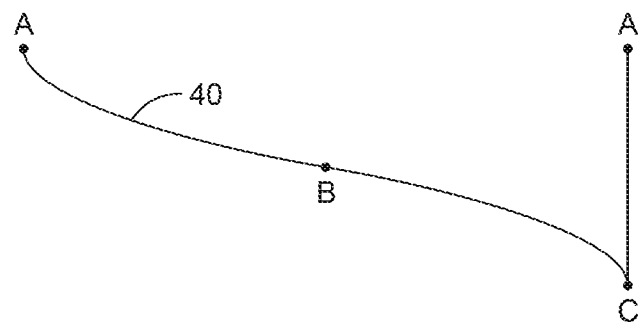
Figure 11:
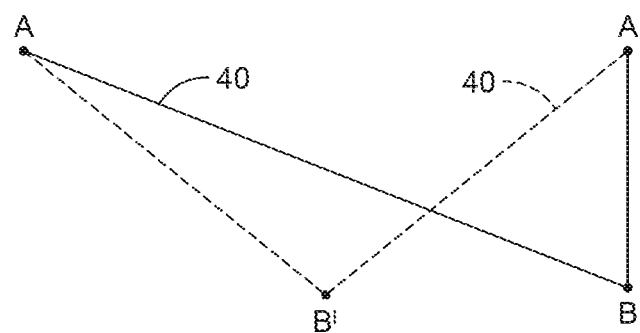
Figure 12:
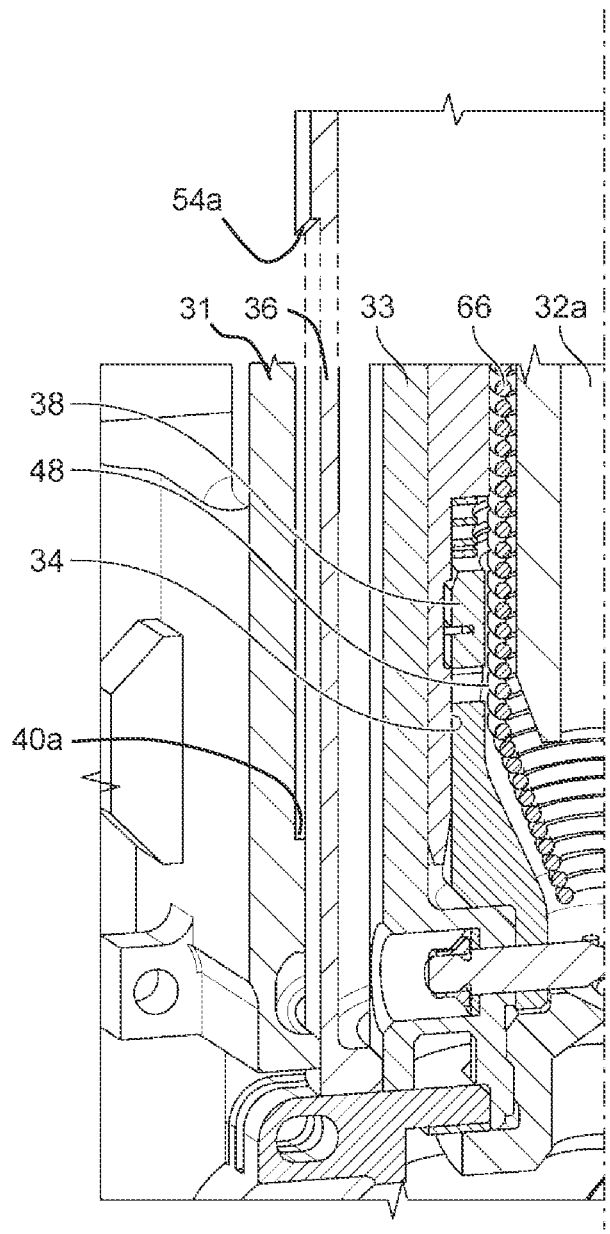

FIG. 6 diagrammatically illustrates the surface profile of the helical orientation surface of FIGS. 3-5, drawn out on a flat plane rather than at the end of an annular component;

FIGS. 7-11 diagrammatically illustrate alternative helical orientation surface profiles, drawn out in the same way as the profile of FIG. 6; and FIG. 12 is a cross-sectional view generally corresponding to the left half of FIG. 3, but showing a modified embodiment.

Figure 1:
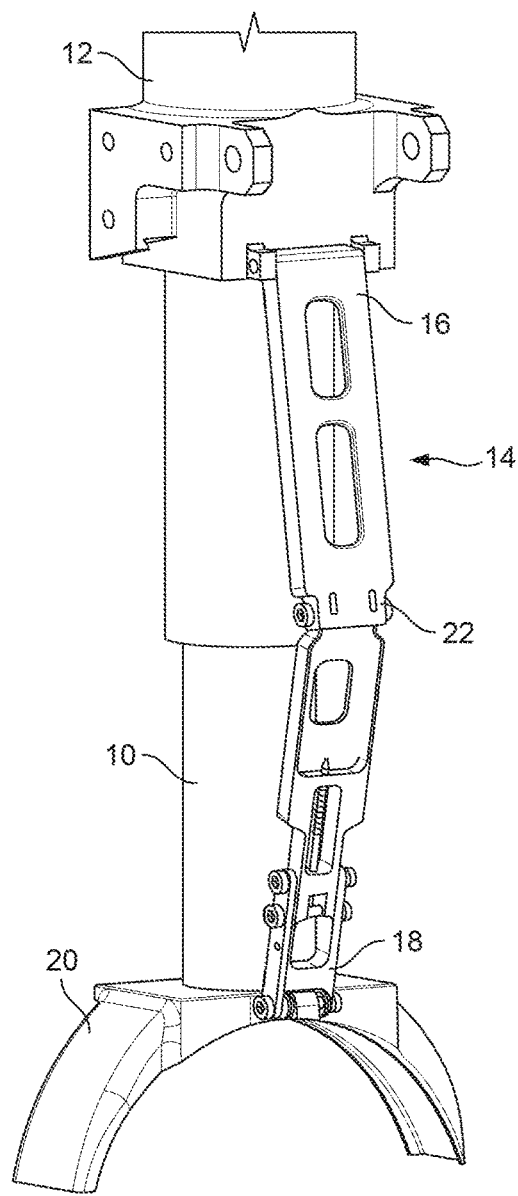
Figure 2:
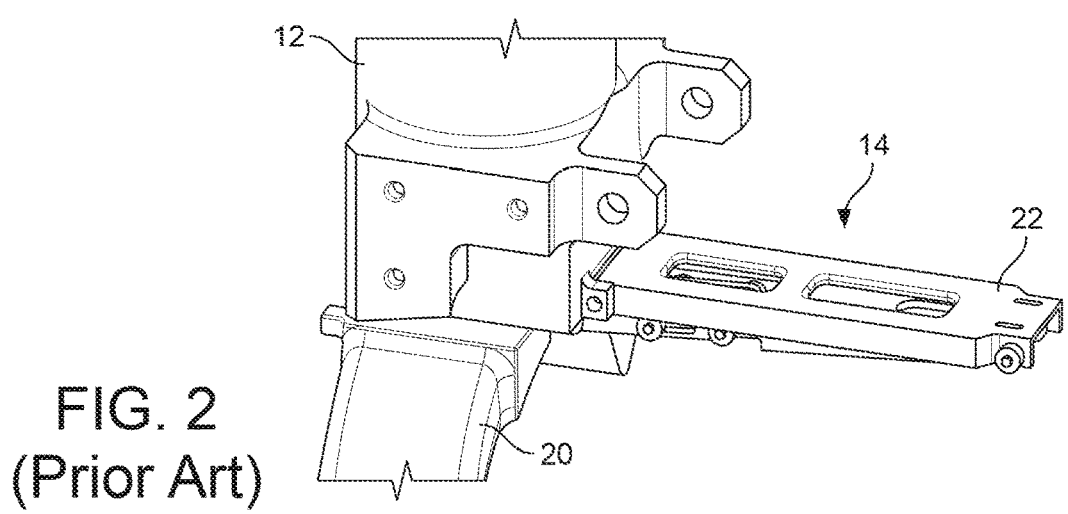

FIG. 1 shows a prior art multi-stage fluid-operated actuator piston 10 extended from its cylinder 12. A specially provided constraint arm 14 is hingedly joined at one end 16 to the cylinder by a 1-degree of freedom pivot, such as a hinge pin mounted in laterally spaced bosses on the cylinder 12. The arm 14 is hingedly joined at its other end 18 to an ejector shoe 20 attached to the free end of the piston 10. The ejector shoe is shaped to engage and push against a load (not shown), which is to be ejected by extension of the piston 10. The arm 14 has a central hinge or elbow 22, allowing it to extend and retract along with the actuator. The hinged joints at 18 and 22 may also allow only single degree of freedom pivoting, about axes parallel to the pivot axis of joint 16. The arm 14 adds to the weight, complexity and expense of the actuator assembly. When the piston is retracted into the cylinder 12 as shown in FIG. 2, the elbow joint 22 of the arm 14 projects laterally a considerable distance.

FIGS. 3 and 4 show longitudinal cross-sectional perspective views through the lower end of a multi-stage, compressed gas operated linear actuator 30 and ejector shoe 20. The actuator 30 is generally similar to the actuators disclosed in GB2530762, and its constructional details and operating principles are further explained there. The actuator 30 comprises a housing or structural support 31 fixedly mounted to a chassis or frame 9, a gas entry sleeve 32, an inner gas entry sleeve 32a concentrically received within the gas entry sleeve 32, a hollow piston 33 and a hollow cylinder 36. FIGS. 3 and 4 show the actuator 30 in its fully retracted position. During initial extension of the actuator 30, the piston 33 and cylinder 36 are locked together and slide along the gas entry sleeve 32, until a staging point is reached, at which an upper end of the piston 33 (not shown) clears the lower end of the gas entry sleeve 32. At the staging point, the cylinder 36 is locked against retraction relative to the gas entry sleeve 32 and housing 31, and the piston 33 is unlocked so that it can slide relative to the cylinder 36, and thereby continue to extend. A return spring 66 is housed in the annular space between the gas entry sleeve 32 and the inner gas entry sleeve 32a; with its upper end (not shown) anchored within the gas entry sleeve 32. The lower end of the return spring 66 is hooked around a clevis pin 68 which spans the lower end of the piston 33. Therefore, when the gas pressure within the actuator is relieved, the return spring 66 pulls the piston 33 and cylinder 36 back to their fully retracted positions on the gas entry sleeve 32 and within the housing 31.

For ease of sealing, the co-operating surfaces of the gas entry sleeve 32 and piston 33, gas entry sleeve 32 and cylinder 36, and piston 33 and cylinder 36, are all circular in transverse cross-section. This means that these components are all free to twist relative to one another, about the operating axis of the actuator 30. (Though in fact extreme twisting of the piston relative to the gas entry sleeve will be resisted by torsion arising in the return spring 66). The ejector shoe 20 is therefore essentially free to rotate to a random orientation relative to the housing 31, about the actuator's operating axis, once any constraint formerly provided by the load ceases to exist, because of ejection of the load. (Typically the actuator 30 is provided as one of a fore-and-aft pair, each engaging a cylindrical load by their arcuate ejector shoes. These shoes are therefore kept in predetermined alignment by such engagement).

To ensure that the ejector shoe 20 returns to a predetermined angular orientation about the actuator's operating axis when the actuator 30 is fully retracted and in the absence of a load or similar restraint, the following features are provided.

The lower end of the gas entry sleeve 32 is counterbored at 34, to receive a generally annular orientation insert 38. A lower end of the orientation insert 38 is shaped to provide a helical orientation surface 40 (FIGS. 4 and 5). The orientation insert 38 and its helical orientation surface 40 are held in a fixed angular orientation relative to the gas inlet sleeve 32, about the actuator 30's operating axis, by a pair of diametrically opposed lugs 42. These are slidably engaged in longitudinal grooves (not shown), formed in the surface of the counterbore 34. The orientation insert 38 is retained in the counterbore 34 by a spring clip 44. The inner portion of the spring clip 44 is trapped in a circumferential groove formed around the outside of the orientation insert. The outer part of the spring clip 44 (and hence the spring clip/orientation insert subassembly) is axially movable between limiting positions, as dictated by the width of a wider groove 46 formed in the counterbore 34. The orientation insert 38 is resiliently biased towards the lower limit position, by a stack of Belville washers 48 installed between the upper end of the orientation insert 38 and the upper end of the counterbore 34. The orientation insert is therefore able to move upwardly against resilient bias, which cushions it from impacts on the helical orientation surface 40.

The clevis pin 68 also secures a generally annular follower insert 50 concentrically within the lower end of the piston 33. The follower insert 50 has an upper end of the same diameter as the orientation insert 38, and a reduced diameter lower end 52 which is snugly received in a narrower bored portion of the piston 33. The clevis pin 68 spans the narrower bored portion and locks the follower insert 50 into position within the lower end of the piston 33 at a predetermined angular orientation relative to the piston 33, about the operating axis of the actuator 30. An upper end of the follower insert 50 is shaped to provide a helical surface 54 complementary to the helical orientation surface 40.

As shown diagrammatically in FIG. 6, the helical orientation surface 40 (and correspondingly the follower insert helical surface 54, substituting "peaks" for "troughs" and vice versa, in the following description) has a first trough A, followed in the clockwise direction when viewed from below, by a first peak C, then a second trough E diametrically opposite trough A, then a second peak G diametrically opposite first peak C, and then back to first trough A. (Trough E and peak G are hidden from view in FIG. 5). As the return spring 66 pulls the piston 33 towards its fully retracted position, the follower insert 50 enters the counterbore 34 in the gas entry sleeve 32. Depending on their relative angular orientation about the operating axis of the actuator 30, one of the two peaks of the follower insert helical surface 54 will encounter either the portion of the helical orientation surface 40 between peak C and trough A, or the portion of the helical orientation surface 40 between peak G and trough A. Whatever the case, this peak of the follower insert helical surface 54 will be guided along the helical orientation surface 40 until it enters and stops at the trough A. Similarly, the other peak of the follower insert helical surface 54 will encounter the helical orientation surface portion C-E or G-E, so as to be guided into the trough E. The piston 33 and the attached ejector shoe 20 are thereby rotated by the follower insert 50 and clevis pin 52, to a predetermined angular orientation about the actuator operating axis, as dictated by the orientation insert 38, which is angularly fixed relative to the gas entry sleeve 32.

The pitch of the orientation insert 38 helical surface 40 as shown in FIGS. 4-6 is not constant over the respective portions A-C, C-E, E-G and G-A. Instead, the surface 40 is convexly curved from point A to an inflexion point B, and then concavely curved from inflexion point B to point C. Similarly, surface 40 is concavely curved from point C to inflexion point D, and convexly curved from inflexion point D to point E; convexly curved from point E to inflexion point F; concavely curved from inflexion point F to point G; concavely curved from point G to inflexion point H and convexly curved from inflexion point H to point A. Therefore, if the peaks of the follower insert helical surface first encounter the orientation insert 38 helical surface 40 a long way away from the troughs E, A, the piston 33 and ejector foot 20 are initially turned at low speed and high mechanical advantage; the angular acceleration increasing and the mechanical advantage decreasing until the inflexion points B,F or D,H are reached;

whereupon the angular speed of the piston and ejector foot begin to decrease again, down towards zero as the peaks of the follower insert helical surface 54 reach and enter the troughs A, E of the orientation insert 38 helical surface 40. There is therefore a smooth engagement between the orientation insert 38 and the follower insert 50, with no chatter. As the inserts 38, 50 fully engage, the impact forces are taken up and cushioned by the Bellville washers 48, the orientation insert 38 being linearly displaced in the piston retraction direction.

Figure 7:
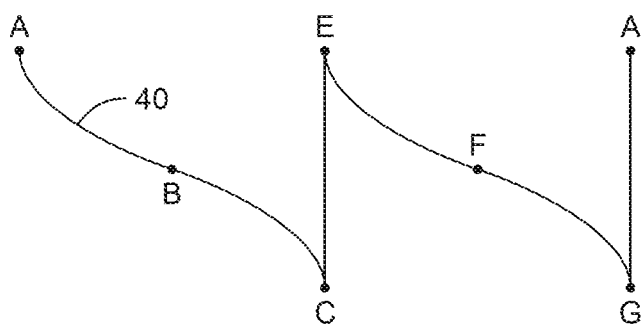

FIG. 7 shows an alternative profile for the orientation insert 38 helical surface 40, for co-operation with a complementarily modified surface on the follower insert 50. The alternative surface profile 40 includes a straight portion extending in the actuator operating direction from the peak C to the adjacent trough E; and a similar straight portion extending in the actuator operating direction from the peak G to the trough A. Therefore when the follower insert 50 and the attached piston 33 and ejector foot 20 encounter the orientation insert 38 helical surface 40, they will only be turned in the anticlockwise direction. Of course mirror image surface profiles are also possible, which will only turn the piston etc. in the clockwise direction.

Figure 8:
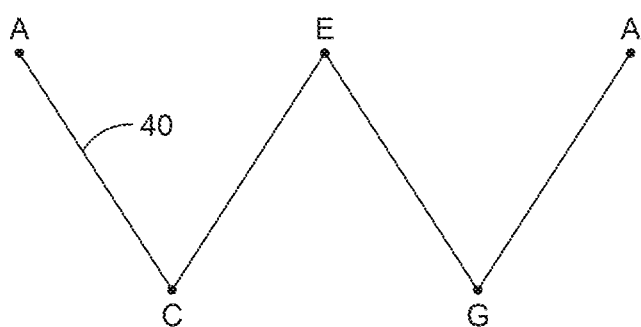

In FIG. 8, there is shown a modified form of the orientation insert 38 helical surface profile 40, in which the helix angle between points A-C, C-E, E-G and G-A is constant and equal (except of course that the slope direction of portions A-C and E-G is opposite to the slope direction of portions C-E and G-A). The accelerations/decelerations arising during engagement between the orientation insert 38 and follower insert 50 are therefore higher in comparison to the FIGS. 4-6 helical surface profiles. But on the other hand, there is patch contact rather than line contact between the inserts 38, 50, as they move towards their final, fully engaged position, and hence potentially reduced wear.

Figure 9:
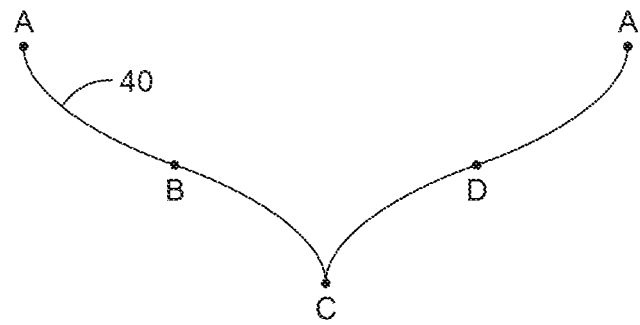

FIG. 9 shows an alternative profile for the orientation insert 38 helical surface 40, for co-operation with a complementarily modified surface on the follower insert 50. There is only a single trough A and a single peak C; and only one pair of inflexion points B,D. The orientation surface 40 of FIG. 9 therefore orientates the piston 33 and ejector foot 20 to a single, unique angular position (compared to the two alternative angular positions possible using the FIG. 6 profile).

FIG. 10 also shows a single peak/single trough profile for the orientation insert 38 helical surface 40, which therefore provides orientation of the piston 33 and ejector foot 20 to a single, unique angular position. But in this case the profile 40 includes a straight portion extending in the actuator operating direction from the peak C to the trough A, similar to the profile shown in FIG. 7 (actually half of that profile, "stretched out" around the entire orientation insert 38 circumference). Therefore the FIG. 10 profile likewise only turns the follower insert 50 and the attached piston 33 and ejector foot 20 in the anticlockwise direction. Of course mirror image surface profiles are again possible, which will only turn the piston etc. in the clockwise direction.

In FIG. 11, the profile 40 shown in solid lines corresponds to the profile 40 of FIG. 10, but the helix angle of profile portion A-B is constant. The profile 40 shown in dotted lines in FIG. 11 corresponds to the profile 40 of FIG. 9, but the profile portions A-B', B'-A have equal and opposite, constant helix angles. The arrangements shown in FIGS. 9-11 subject the inserts 38, 50 to a degree of off-axis loading during engagement, though this becomes less severe in the case of the FIG. 11 profiles 40 when the degree of angular misalignment is small.

Other arrangements are possible, similar to those described above, but which have more than two peaks and troughs and which therefore provide a corresponding number of different predetermined angular orientations of the ejector foot 20 and piston 33 (n peaks/troughs providing n possible different angular orientations).

The orientation surface profile 40 on the orientation insert 38 or the orientation surface profile 54 on the follower insert in any of the arrangements described above with reference to FIGS. 4-11 may be replaced by one or more "orientation probes", i.e. protuberances extending towards the orientation surface of the opposite insert, in the actuator operating direction; e.g. with the number and circumferential position of the orientation probes corresponding to the number and position of the peaks described above (although the number of orientation probes may be less than the corresponding number of peaks, so long as at least one orientation probe is present). It can therefore be seen that either the piston 33 or the gas entry sleeve 32 may constitute the first component as defined on page 2 above, with the other one of the piston 33 or the gas entry sleeve then being the second component as defined on page 2 above. The respective orientation surfaces and/or orientation probes may be formed directly on the first and/or second component, rather than on an insert assembled to the first and/or second component. The first and second component may be constituted by other parts of the actuator, e.g. external parts. For example, one of the first and second parts may be constituted by the ejector shoe 20 and the other of the first and second parts may be constituted by the actuator housing 31.

Additionally or alternatively, similar angular orientation arrangements may be provided to act between other parts of the actuator; for example a helical follower surface 54a on the cylinder 36 and a helical orientation surface 40a on the housing 31 (see FIG. 12), and similarly between the piston 33 and the cylinder 36 (not shown), so that the piston is orientated to a predetermined angular position (or set of predetermined angular positions) relative to the housing 31, about the actuator operating axis, when the actuator is fully extended.

The invention claimed is:

1. A linear actuator having a housing for sealingly containing a pressurized fluid and comprising a mounting by which the housing is fixedly mounted to a chassis or frame, and a load engaging member engageable with a load such that relative rotation between the load engaging member and the load is prevented; the load engaging member being movable relative to the housing along an operating axis; in which a helical orientation surface is disposed about the operating axis and in a fixed angular position relative to one of the housing or load engaging member; in which a follower is disposed in a fixed angular position about the operating axis relative to the other of the housing or load engaging member; and in which when the load engaging member is moved relative to the housing towards an end of the operating axis, the follower moves from a disengaged condition in which free relative rotation of the load engaging member and the housing about the operating axis is allowed, to a condition in which the follower engages and moves along the helical orientation surface to rotate the load engaging member relative to the housing about the operating axis, until the follower reaches a predetermined position along the helical orientation surface; whereby the housing and the load engaging member are brought to a predetermined relative angular position about the operating axis by the movement of the follower along the helical orientation surface, at one or both of the extended or retracted positions of the linear actuator.

2. The linear actuator of claim 1, in which the end of the operating axis towards which the load engaging member is moved relative to the housing comprises the end at which the housing and the load engaging member are retracted relative to one another.

3. The linear actuator of claim 2, in which the one of the load engaging member and the housing and the other of the load engaging member and the housing are provided with a further helical orientation surface and a further follower respectively, positioned and arranged to operate similarly to the helical orientation surface and follower, so that the load engaging member and the housing are brought into a predetermined angular orientation relative to one another about the operating axis, in both the extended and in the retracted position relative to one another.

4. The linear actuator of claim 1, in which the follower comprises a helical surface complementary to the helical orientation surface.

5. The linear actuator of claim 1, in which the follower and/or the helical orientation surface are resiliently mounted for limited movement along the operating axis.

6. The linear actuator of claim 1, in which the helical orientation surface comprises a single peak and a single trough.

7. The linear actuator of claim 1, in which the helical orientation surface comprises a plurality of peaks and a plurality of troughs.

8. The linear actuator as defined in claim 1, in which the helical orientation surface is generally annular in plan, when viewed along the operating axis.

9. The linear actuator of claim 8, in which the helical orientation surface comprises a peak and slopes helically to either side of the peak towards a trough or troughs.

10. The linear actuator of claim 8, in which the helical orientation surface comprises a peak and only slopes from one side of the peak towards a trough.

11. The linear actuator of claim 1, in which the helical orientation surface and the follower are internal to the actuator.

12. The linear actuator as defined in claim 1, which is a multi-stage linear actuator and in which the one of the helical orientation surface and the follower is mounted to a gas entry sleeve and the other of the helical orientation surface and the follower is mounted to an inner telescopic component of the multi-stage actuator.

13. The linear actuator of claim 1, in which the helical orientation surface is formed on an insert received in one of the housing or load engaging member.

14. The linear actuator as defined in claim 13, in which the follower comprises an insert received in the other of the housing or load engaging member.

* * * * *